United States Patent
Santiago et al.

(10) Patent No.: US 11,385,453 B2
(45) Date of Patent: Jul. 12, 2022

(54) ADAPTIVE RETRO-REFLECTOR (AR)

(71) Applicant: The Government of the United States of America, as represented by the Secretary of the Navy, Arlington, VA (US)

(72) Inventors: Freddie Santiago, Fort Washington, MD (US); Carlos Font, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 242 days.

(21) Appl. No.: 16/504,683

(22) Filed: Jul. 8, 2019

(65) Prior Publication Data
US 2020/0012088 A1    Jan. 9, 2020

Related U.S. Application Data

(60) Provisional application No. 62/695,310, filed on Jul. 9, 2018.

(51) Int. Cl.
*G02B 26/00* (2006.01)
*G02B 5/122* (2006.01)

(52) U.S. Cl.
CPC ........... *G02B 26/004* (2013.01); *G02B 5/122* (2013.01)

(58) Field of Classification Search
CPC ... G02B 26/004; G02B 5/122; G02B 27/0025
See application file for complete search history.

(56) References Cited

U.S. PATENT DOCUMENTS

| | | | |
|---|---|---|---|
| 9,042,027 B2* | 5/2015 | Egan | G02C 11/10 |
| | | | 359/666 |
| 2016/0246063 A1* | 8/2016 | Smith | G01S 7/497 |
| 2018/0361232 A1 | 12/2018 | Mallinson | |

FOREIGN PATENT DOCUMENTS

| | | | | |
|---|---|---|---|---|
| GB | 2418028 A | * | 3/2006 | ............ G01S 17/74 |
| WO | WO 2016/046285 A1 | | 3/2016 | |
| WO | WO-2016046285 A1 | * | 3/2016 | ....... G02F 1/133553 |

OTHER PUBLICATIONS

Goetz et al., Modulating Retro-reflector Lasercom Systems at the Naval Research Laboratory. The 2010 Military Communications Conference—Unclassified Program—Systems Perspectives Track, Oct. 31, 2010, p. 2302,2307, IEEE, Piscataway, NJ USA.

(Continued)

*Primary Examiner* — Jade R Chwasz
(74) *Attorney, Agent, or Firm* — US Naval Research Laboratory; Suresh Koshy

(57) ABSTRACT

An apparatus includes an adaptive retro-reflector device. The adaptive retro-reflector device includes a standard retro-reflector. In operation, the retro-reflector receives an incident optical signal and outputs a returned optical signal. The returned optical signal exhibits a divergence. The adaptive retro-reflector device includes an elastomeric interface. The elastomeric interface is in optical communication with the retro-reflector such that the incident optical signal passes through the elastomeric interface to the retro-reflector and such that the returned optical signal from the retro-reflector passes through the elastomeric interface. The elastomeric interface includes an interface surface. The apparatus includes a standard actuator. The actuator in operation communicates with the elastomeric interface so as to deform the interface surface, thereby controlling the divergence. Optionally, the elastomeric interface includes a standard elastomeric membrane and a standard optically transparent (Continued)

optical fluid. The optically transparent optical fluid is at least partially encapsulated by the elastomeric membrane.

20 Claims, 11 Drawing Sheets

(56) References Cited

OTHER PUBLICATIONS

Gilbreath et al., Modulating retroreflector architecture using multiple quantum wells for free space optical communications, 1998 International Conference on Applications of Photonic Technology, Ottawa, Canada, Proceedings of SPIE, 1998, pp. 581-586, vol. 3491, SPIE, Bellingham, WA USA.

Hofherr et al., Long-range active retroreflector to measure the rotational orientation in conjunction with a laser tracker, SPIE/COS Photonics Asia, Beijing, China, Proceedings of SPIE, 2014, pp. 92760V-1-92760V-11, vol. 9276, SPIE, Bellingham, WA USA.

* cited by examiner

ADAPTIVE RETRO-REFLECTOR (AR)

CROSS-REFERENCE TO RELATED APPLICATIONS

This application claims priority to U.S. Provisional Patent Application Ser. No. 62/695,310, entitled "ADAPTIVE RETRO-REFLECTOR ("AR")," to Santiago et al., which was filed on 9 Jul. 2018 and is incorporated herein by reference.

BACKGROUND OF THE INVENTION

Field of the Invention

This invention relates in general to an optical retro-reflector, and in particular to an adaptive optical retro-reflector.

Description of the Related Art

Retro-reflectors are passive devices that return an incident optical beam through the same propagation path. Conventional passive retro-reflectors can be implemented in different systems configurations. For example, in a conventional monostatic configuration, a receiver ("Rx") and a transmitter ("Tx") are collocated. A large percentage of the energy in a monostatic-configured passive retro-reflector is wasted due to the divergence of the beam and turbulence effects. Other examples include a bi-static configuration in which the Tx and the Rx are not collocated, and an off-axis configuration in which the Tx and Rx do not share the same propagation path. A passive retro-reflector having a conventional bi-static or off-axis configuration either requires a second transmitter for the return signal, or increases divergence to increase footprint of returning beam, which leads to energy losses. Such energy losses limit performance and propagation distances of a passive retro-reflector having a bi-static or off-axis configuration. As yet another example, a glass lens can be placed in front of a conventional retro-reflector to change the divergence of the beam. However, this lens limits the performance of the system because there is always power introduced in the system due to the lens and the fixed prescription of such lens. If such a conventional configuration sits on one or more movable platforms, the performance of the configuration is also negatively impacted by platform dynamics, e.g., the platform moving or by moving from one platform to another. For example, the performance of a conventional passive retroreflector or a conventional lens-passive-retroreflector combination is limited or degraded by the constant change in distance between platforms and/or other effects as mentioned above.

BRIEF SUMMARY OF THE INVENTION

An embodiment of the invention changes the divergence of a return optical signal beam from a retro-reflector to optimize an bi-static or monostatic, optical link, achieving higher link performance or longer distances than what can be obtained with a passive system. An embodiment of the invention allows rapid control of the beam divergence. A particular embodiment of the invention, depending on a particular actuation mechanism, maintains a divergence state without the consumption of power. For example, an embodiment of the invention including a mechanical actuator maintains a divergence state without the consumption of power. Once such a mechanical actuator is set to a particular position, then this embodiment of the invention is effectively preloaded and does not consume additional power to maintain the particular position. Another embodiment of the invention, depending on another actuation mechanism, maintain a divergence state while consuming a minimal amount of power. For example, an embodiment of the invention including a magnetic actuator or an embodiment of the invention including a dielectric elastomer actuator maintains a divergence state with minimal consumption of power.

An embodiment of the invention increases distances usable in an optical communication system by optimizing the divergence of the beam (i.e., improving the optical link budget). This feature makes the use of such an embodiment of the invention in dynamic systems in which optical communication distances vary (e.g., unmanned vehicles, small mobile platforms) advantageous.

An embodiment of the invention corrects for low order aberration, such as defocus Depending on the actuator chosen, an embodiment of the invention is implemented as a low order adaptive correction apparatus, in which focus can be corrected, thereby optimizing the beam. Alternatively, again depending on the actuator chosen, an embodiment of the invention is implemented as a higher order correction apparatus, and such an apparatus optionally is implemented as part of an adaptive optics system in a small form factor package.

Embodiments of the invention are adaptable for inclusion in a variety of optical systems and in a variety of environments. For example, multiple embodiments of the invention are used in parallel as sub-components of a main optical communication system to provide feedback to a main system to enhance or to optimize the main system's capabilities in the field. For example, one or more embodiments of the invention are included a multi-use system by enabling capabilities, such as optical free-space communications, range finding, optical scintillometer applications, chemical agent sensing, biological agent sensing, and/or adaptive optics correction.

DETAILED DESCRIPTION OF THE INVENTION

Figure 1:
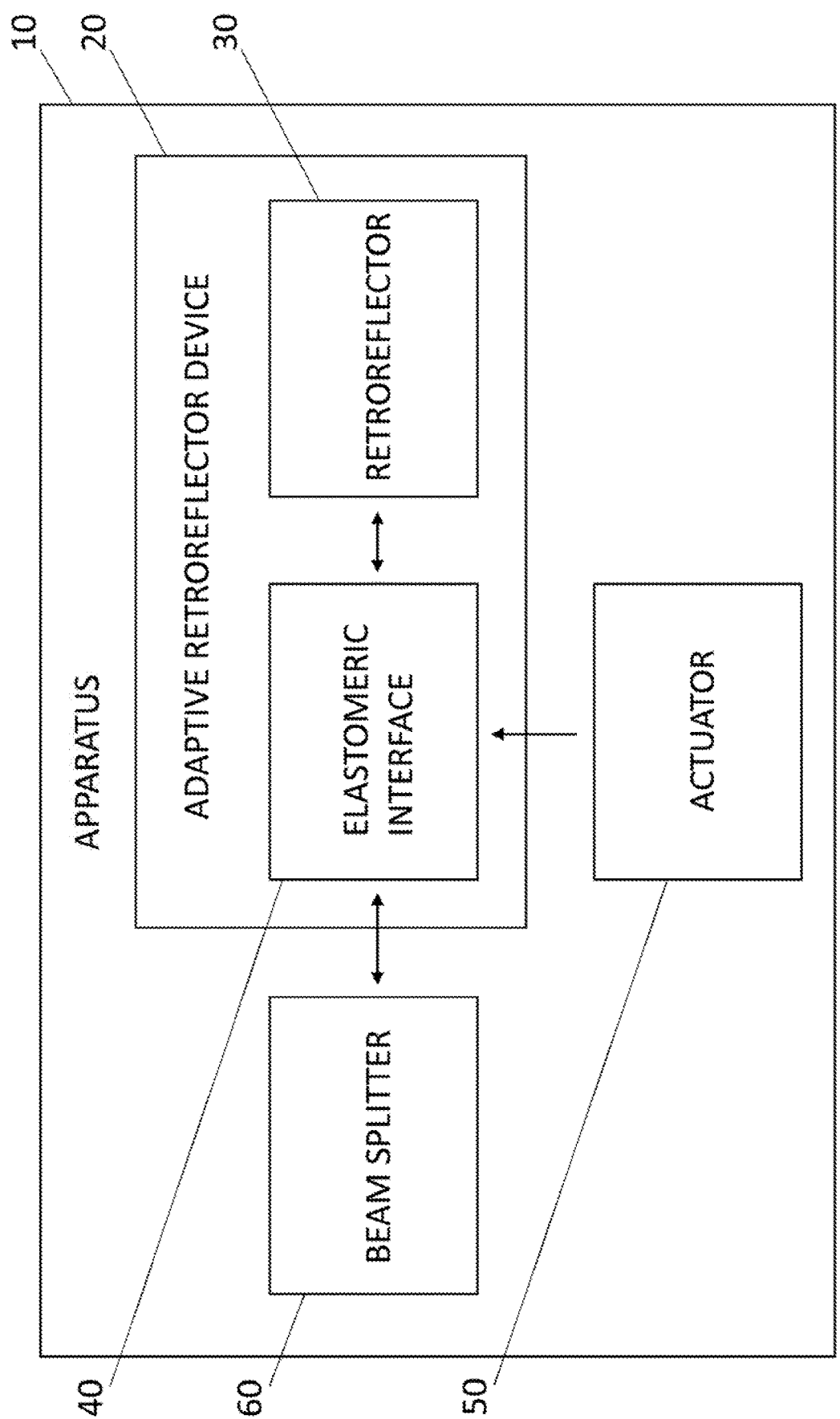
FIG. 1 is a block diagram of an embodiment of the invention.

An apparatus 10 according to an embodiment of the invention is described as follows with reference by way of illustration to FIG. 1. The apparatus 10 includes a refractive active element, namely, an adaptive retro-reflector device 20. The adaptive retro-reflector device 20 includes a standard retro-reflector 30. In operation, the retro-reflector 30 receives an incident optical signal (i.e., an incident beam of electromagnetic radiation) and outputs a returned optical signal (i.e., an outgoing beam of electromagnetic radiation). The returned optical signal includes, or exhibits, a change in divergence. For the purpose of this patent application, "divergence" of an optical signal is defined as how much, in terms of an angular measurement, the beam diameter changes with increasing distance. That is, divergence refers to how fast a light beam expands far from its beam waist. For longer distances, light beams exhibit divergence due to diffraction, atmospheric effects (e.g., thermal effects), and the nature of a light source's (e.g., a laser's) operation. The adaptive retro-reflector device 20 also includes an elastomeric interface 40. The elastomeric interface 40 is in optical communication with the retro-reflector 30 such that the incident optical signal passes through the elastomeric interface to the retro-reflector and such that the returned optical signal from the retro-reflector passes through the elastomeric interface. The elastomeric interface 40 includes an interface surface. The apparatus 10 includes a standard actuator 50. The actuator 50 in operation communicates with the elastomeric interface 40 so as to deform the interface surface, thereby controlling the divergence.

Optionally, the retro-reflector 30 includes a standard hollow retro-reflector, a standard solid retro-reflector, a standard corner cube retro-reflector, or a standard cat's eye retro-reflector.

Optionally, the elastomeric interface 40 includes a standard optical polymer. For the purpose of this patent application, the phrase "optical polymer" is defined as a polymer that is transparent at a wavelength or a range of wavelengths for the desired use of an embodiment of the invention. In some desired uses of an embodiment of the invention, one of ordinary skill in the art will readily appreciate that the optical polymer is, for example, a standard elastomer or a standard flexible polymer. That is, for example, the optical polymer is a polymer that exhibit elastic properties, such as one that is flexible or rubber-like. Optionally, the optical polymer includes polydimethylsiloxane, a standard elastic polymer, polymethyl methacrylate, polycarbonate, polystyrene, and/or a standard liquid (such as discussed below) encapsulated by the elastomer. In some other desired uses of an embodiment of the invention, one of ordinary skill in the art will readily appreciate that the optical polymer is alternatively, for example, a standard hard polymer or a standard glass that is sufficiently thin that it can be deformed by the actuator 50, resulting in limited deformation performance owing to the limited change of the thin polymer or glass. For example, such a hard polymer or glass is 1 mm thick or less.

Optionally, the interface surface includes an unflexed interface surface or a deformed interface surface. For the purpose of this patent application, "unflexed" characterizes a resting state of the interface surface, when the elastomeric interface is not acted upon by the actuator. For the purpose of this patent application "deformed" characterizes a variation from the resting state of the interface surface, when the elastomeric interface is acted upon by the actuator. The unflexed interface surface includes a flat interface surface, a concave interface surface, or a convex interface surface. The deformed interface surface includes a convex interface surface, a flat interface surface, or a concave interface surface. For example, deformation induced in the elastomeric interface by the actuator converts the unflexed interface surface to the deformed interface surface. That is, if the unflexed state of the interface surface is flat, sufficient deformation of the interface surface by the actuator 50 will yield a convex or concave interface surface, depending on the elastomeric interface 40 and/or the side of the interface surface being deformed by the actuator. Alternatively, if the unflexed state of the interface surface is convex or concave, sufficient deformation of the interface surface by the actuator 50 produces a flat interface surface. Further deformation of the interface surface by the actuator 50 produces a concave or convex interface surface, respectively.

Figure 2A:
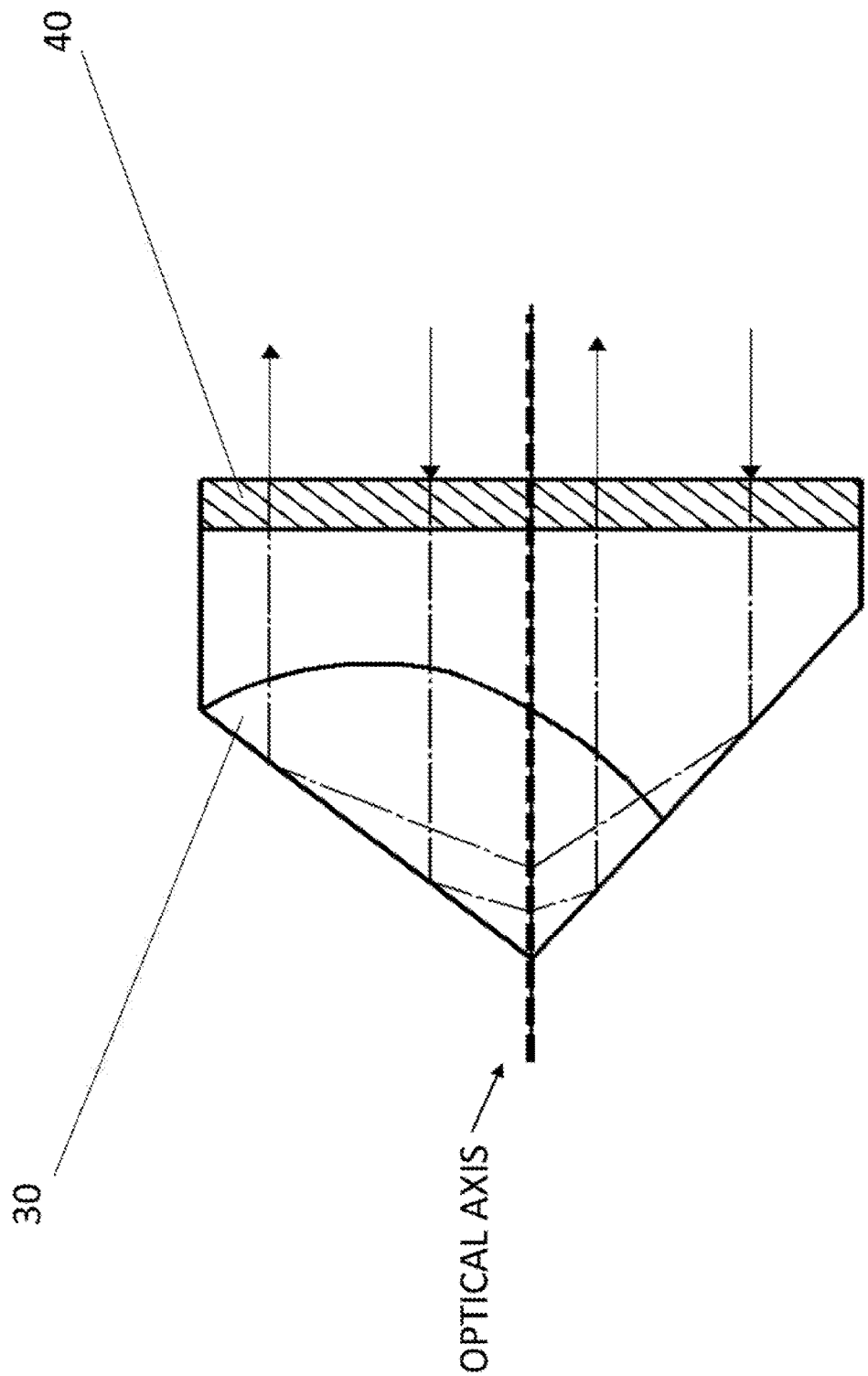
FIG. 2A is a sectional view along the optical axis of an adaptive retro-reflector device with a flat, 1-component elastomeric interface according to embodiment of the invention, the figure showing a ray diagram of illustrative rays of a returned optical signal parallel to illustrative rays of an incident optical signal.
Figure 2B:
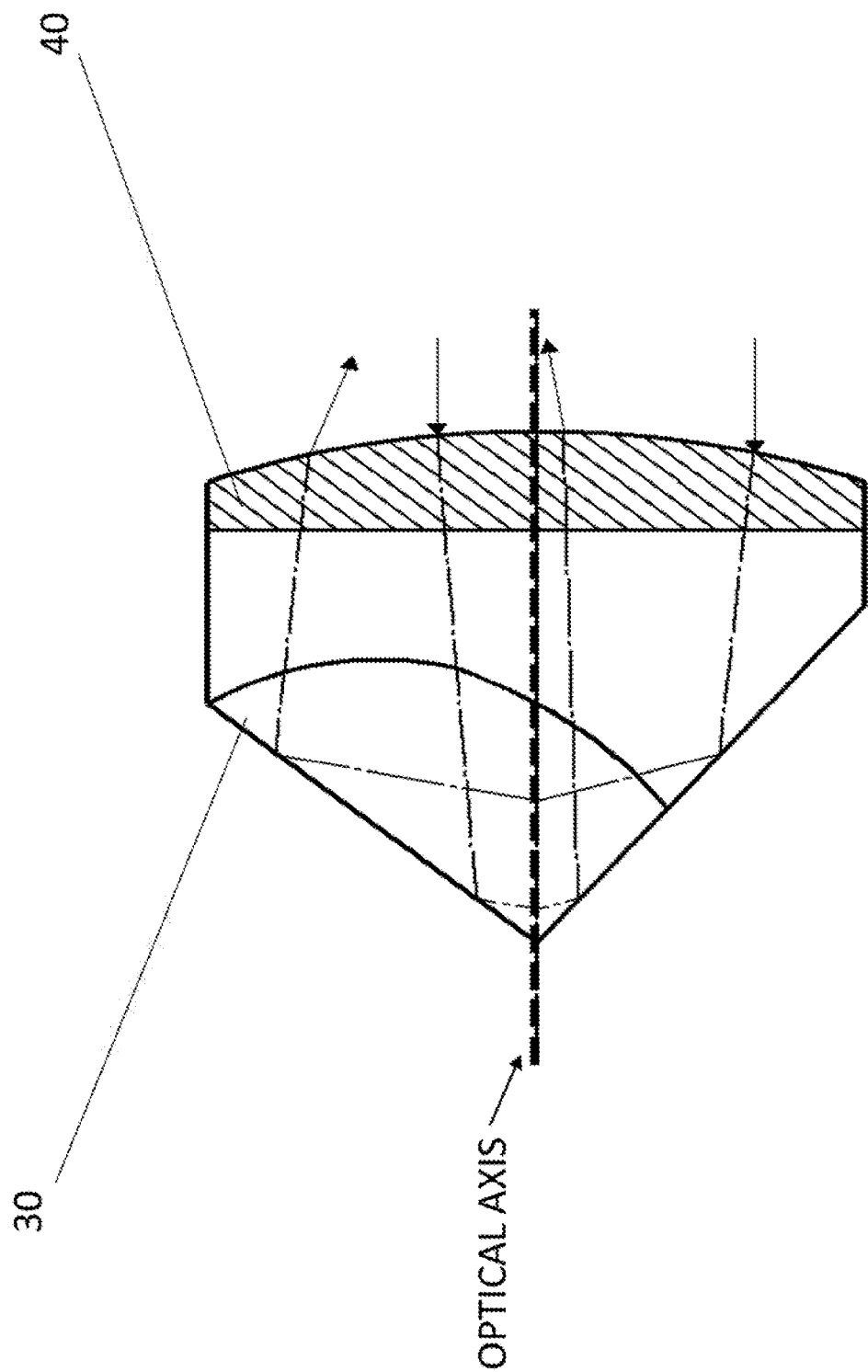
FIG. 2B is a sectional view along the optical axis of an adaptive retro-reflector device with a convex, 1-component elastomeric interface according to an embodiment of the invention, the figure showing a ray diagram of illustrative rays of a returned optical signal converging relative to illustrative rays of an incident optical signal.
Figure 2C:
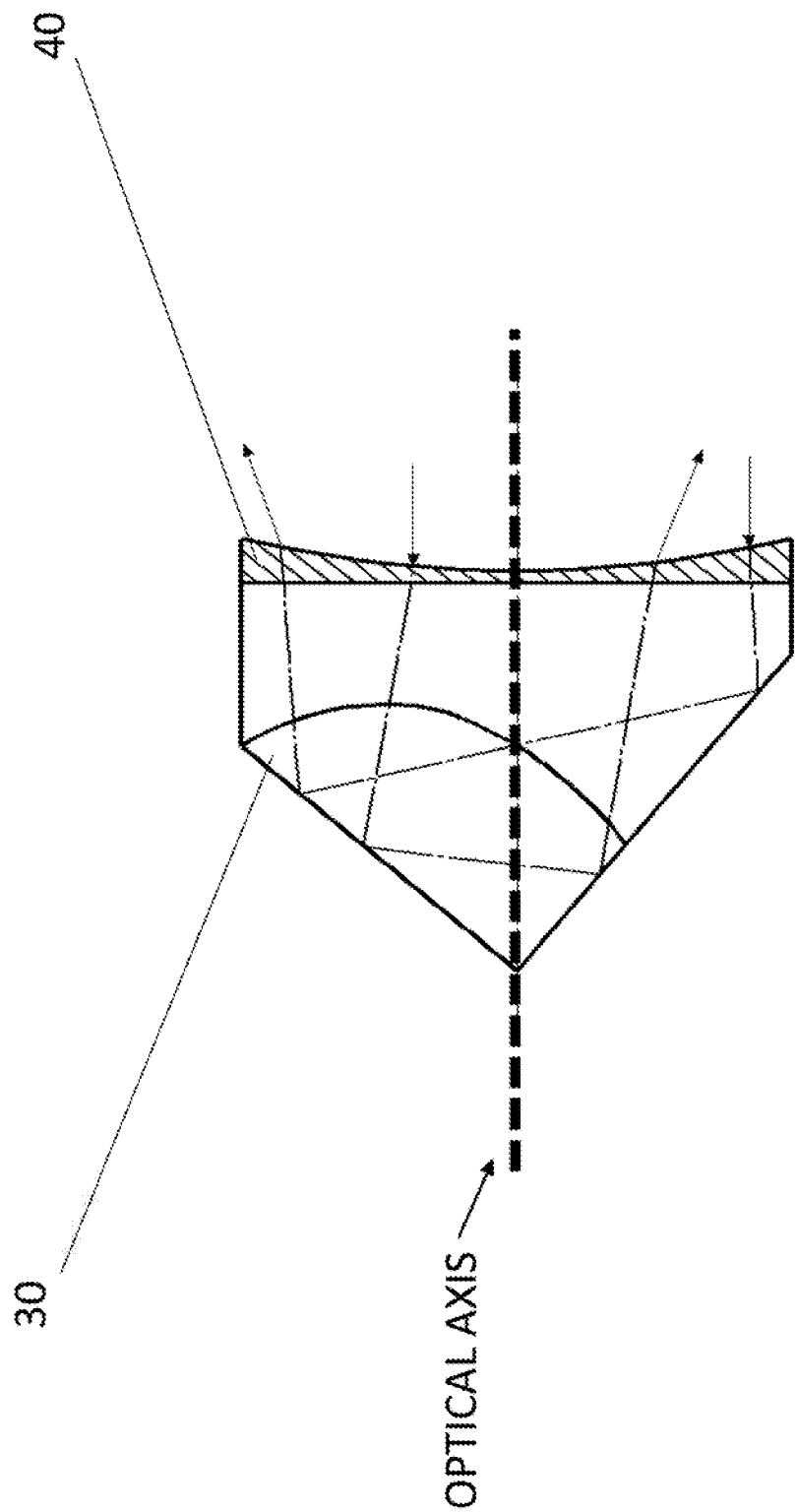
FIG. 2C is a sectional view along the optical axis of an adaptive retro-reflector device with a concave, 1-component elastomeric interface according to embodiment of the invention, the figure showing a ray diagram of illustrative rays of a returned optical signal diverging relative to illustrative rays of an incident optical signal.

FIGS. 2A-2C shows a sectional view along a common optical axis (indicated by the bold dash-dash line segments) of an embodiment of the invention including three operational states of the adaptive retro-reflector device 20. Illustrative effects of the interface surface for a 1-component (i.e., literally, a unitary) elastomeric interface 40 are shown by way of the ray diagrams (indicated by the dash-dot rays) in FIGS. 2A-2C. FIGS. 2A-2C show the elastomeric interface 40 as being aligned with the retroreflector 30 along the common optical axis. FIG. 2A shows an embodiment of the invention having a flat interface surface. Rays of the incident optical signal are received and reflected by the adaptive retro-reflector device 20. Rays of the returned optical signal from the adaptive retro-reflector device 20 are parallel to the rays of the incident optical signal. For example, the incident optical signal is collimated, and the returned (or reflected) optical signal is also collimated. FIG. 2B shows an embodiment of the invention having a convex interface surface. Rays of the incident optical signal are received and reflected by the adaptive retro-reflector. Rays of the returned optical signal from the adaptive retro-reflector exhibit convergence relative to the rays of the incident optical signal. For example, light rays of the incident optical signal are collimated, and light rays of the returned optical signal are converging, as indicated by the arrows, toward the optical axis of the retroreflector 30. In practice, the ray bending occurs at each material interface, i.e., at the air-to-elastomeric-interface interface and at the elastomeric-interface-toretroreflector interface. However, for ease of illustration and understanding, only the ray bending at the air-to-elastomeric-interface interface is shown in FIG. 2B. Additionally, for ease of illustration and understanding, ray reflection in the retroreflector 30 in FIG. 2B is shown in an idealized or stylistic manner. In practice, the location of the ray reflection in the retroreflector 30 depends on the geometry and wall thicknesses of the retroreflector. FIG. 2C shows an embodiment of the invention having a concave interface surface. Rays of the incident optical signal are received and reflected by the adaptive retro-reflector. Rays of the returned optical signal from the adaptive retro-reflector exhibit divergence relative to the rays of the incident optical signal. For example, light rays of the incident optical signal are collimated, and light rays of the returned optical signal are diverging, as indicated by the arrows, away from the optical axis of the retroreflector 30. In practice, the ray bending occurs at each material interface, i.e., at the air-to-elastomeric-interface interface and at the elastomeric-interface-to-retroreflector interface. However, for ease of illustration and understanding, only the ray bending at the air-to-elastomeric-interface interface is shown in FIG. 2C. Additionally, for ease of illustration and understanding, ray reflection in the retroreflector 30 in FIG. 2C is shown in an idealized or stylistic manner. In practice, the location of the ray reflection in the retroreflector 30 depends on the geometry and wall thicknesses of the retroreflector. Depending on the actuator of one or more embodiments of the invention, the change from one of the three operational states to another is quick, for example, less than 0.5 seconds. In practice, there are environmental processes, such as atmospheric turbulence, that change quicker than 0.5 seconds. Advantageously, an embodiment of the invention that can change between the three operational states as quickly as one or more of these environmental processes is able to correct for one or more of them.

Figure 3:
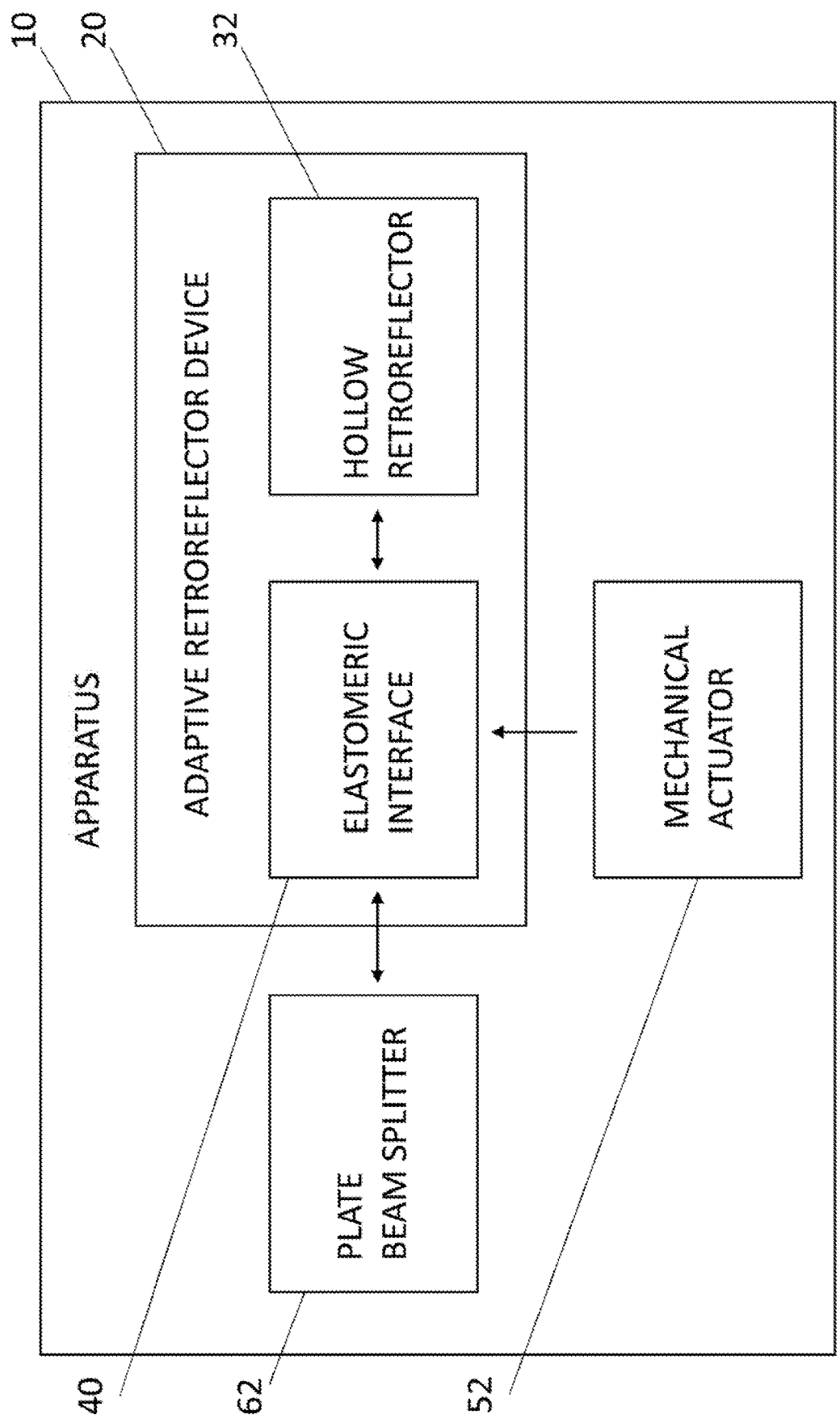
FIG. 3 is a block diagram of another embodiment of the invention.

Optionally, in an embodiment of the invention as shown by way of illustration to FIG. 3, the retro-reflector 30 and the elastomeric interface 40 includes, or shares, a common optical axis. The actuator 50 includes a standard mechanical actuator 52. The mechanical actuator 52 includes a standard cylinder that is longitudinally translatable along the optical axis. Optionally, the interface surface includes an interface periphery. The cylinder is in communication with the interface periphery. In another embodiment of the invention, the actuator deform the elastomeric interface by touching the interface surface but not at the interface periphery. For example, in a fluid-based embodiment of the invention, the actuator compresses the sides of the column of elastomer, by pumping fluid in and out, thereby compressing the flexible material on the sides.

Figure 4:
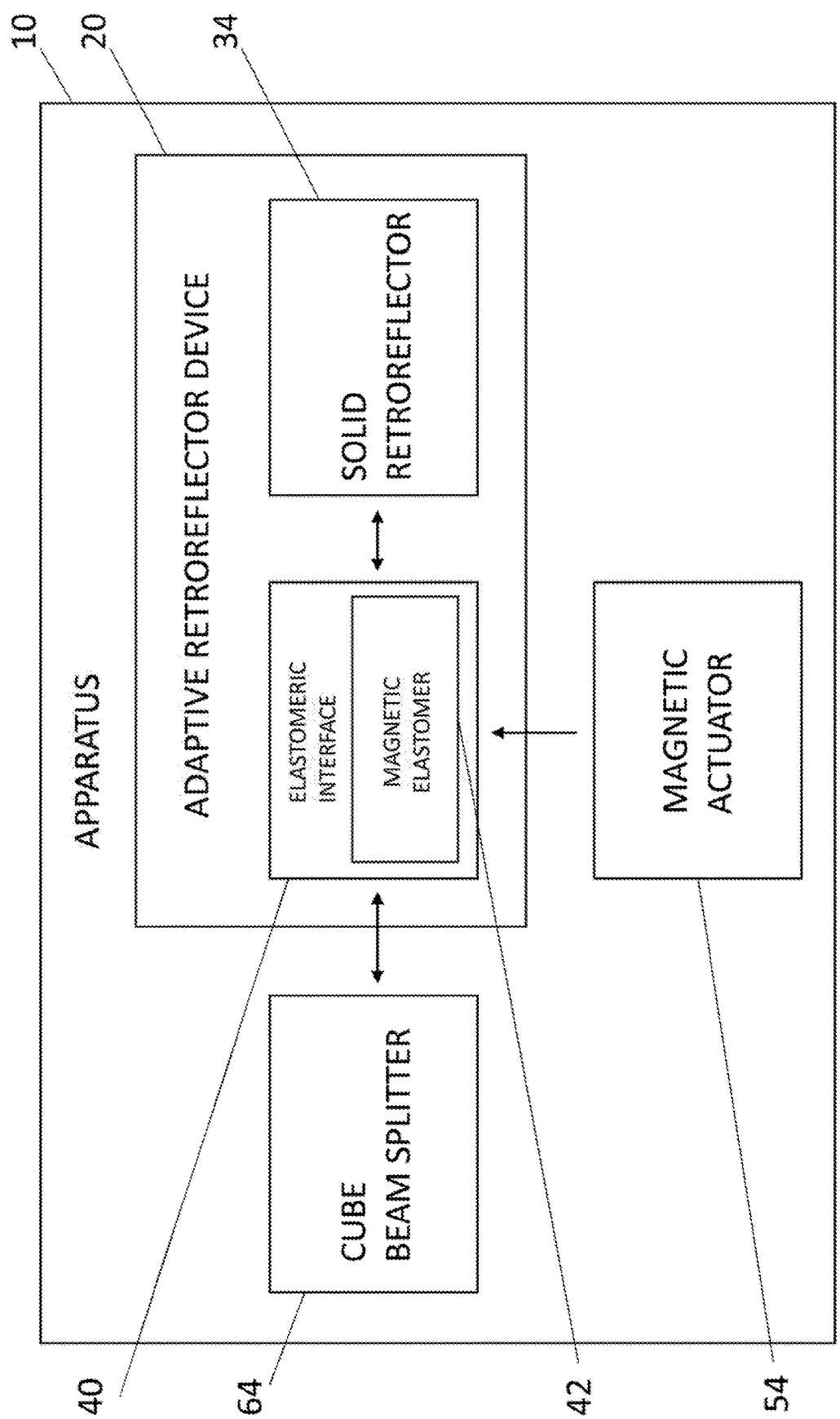
FIG. 4 is a block diagram of another embodiment of the invention.

Optionally, in an embodiment of the invention as shown by way of illustration to FIG. 4, the retro-reflector 30 and the elastomeric interface 40 include an optical axis. The elastomeric interface 40 includes a standard magnetic elastomer 42. The actuator includes a standard magnetic actuator 54. The magnetic actuator 54 is in communication with the interface surface. Optionally, the interface surface includes an interface periphery. The magnetic actuator is in communication with the interface periphery.

Figure 5:
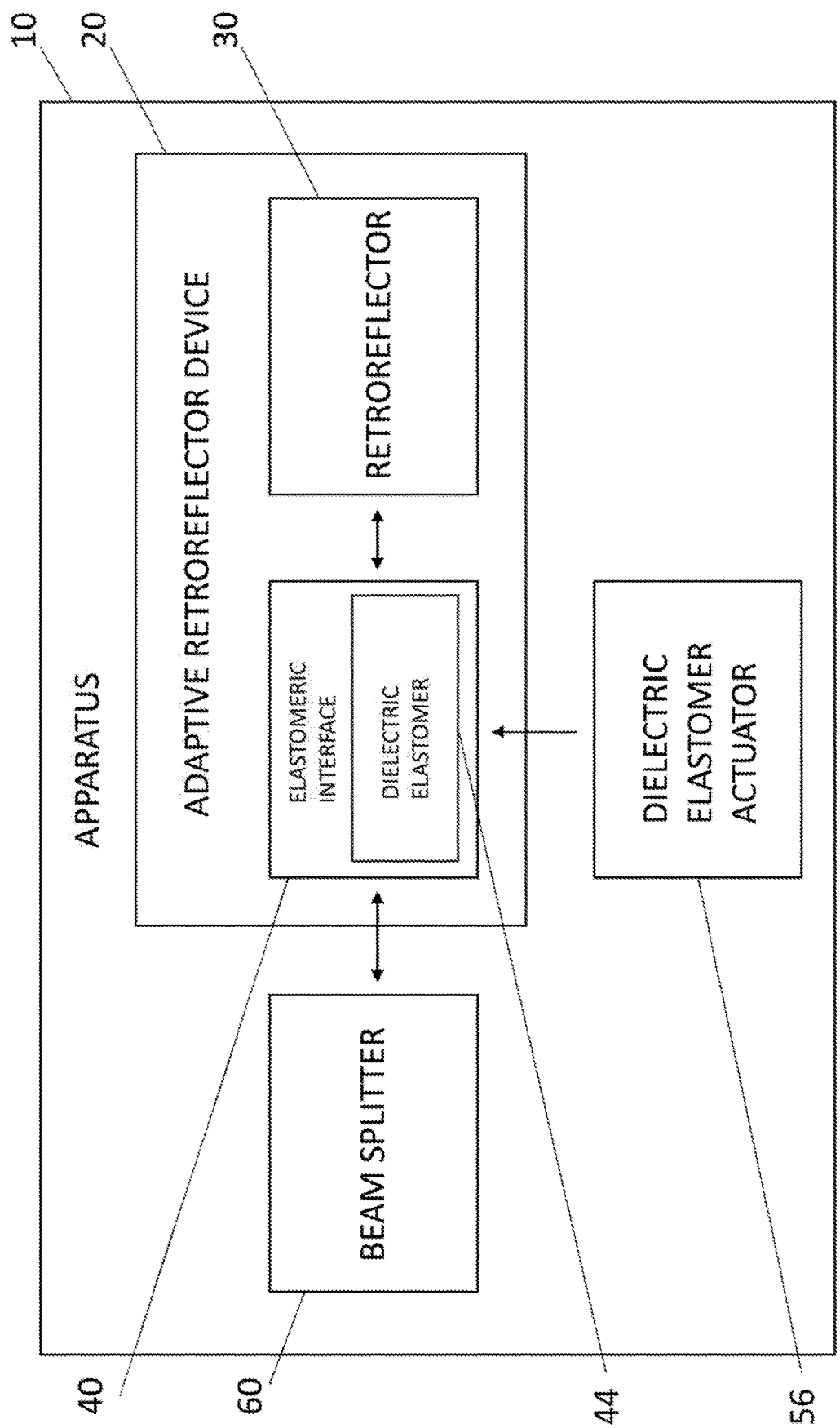
FIG. 5 is a block diagram of another embodiment of the invention.

Optionally, in an embodiment of the invention as shown by way of illustration to FIG. 5, the retro-reflector 30 and the elastomeric interface 40 include an optical axis. The interface surface includes an interface periphery. The elastomeric interface 40 includes a standard dielectric elastomer 44. The actuator comprises a standard dielectric elastomer actuator 56. The dielectric elastomer actuator 56 is in communication with the interface surface. Optionally, the interface surface comprises an interface periphery, said dielectric elastomer actuator being in communication with the interface periphery.

Figure 6:
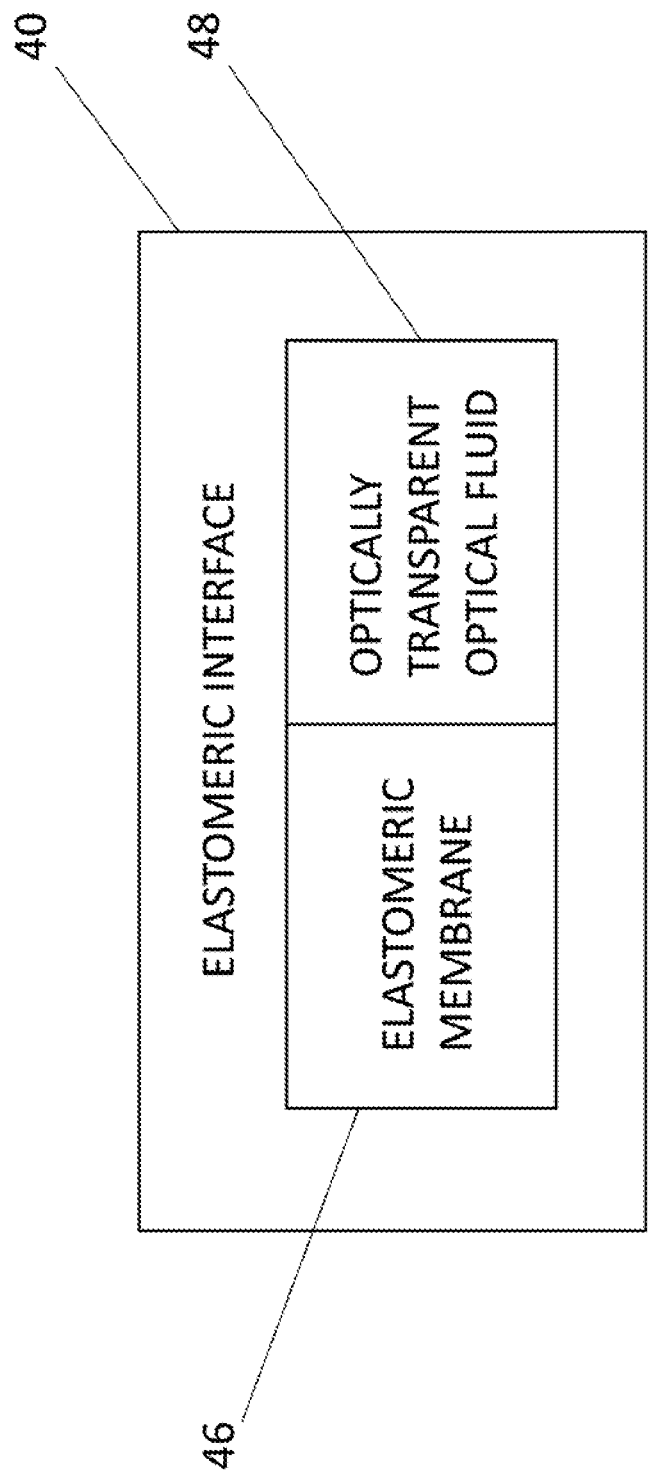
FIG. 6 is a block diagram of an elastomeric interface according to another embodiment of the invention.

Optionally, in an embodiment of the invention as shown by way of illustration to FIG. 6, the elastomeric interface 40 includes a standard elastomeric membrane 46 and a standard optically transparent optical fluid 48. The optically transparent optical fluid is 48 at least partially encapsulated by the elastomeric membrane 46. In practice, one of ordinary skill in the art will readily recognize that, in cooperation with the elastomeric membrane 46, a standard holder 49 is optionally needed to partially encapsulate the optically transparent optical fluid 48. Optionally, the elastomeric membrane 46 includes polydimethylsiloxane, a standard elastic polymer, polymethyl methacrylate, polycarbonate, polystyrene, and/or liquid silicone. Optionally, the optical fluid 48 includes standard water, standard glycerol, a standard oil, a standard polymer, and/or a standard resin. One of ordinary skill in the art will readily appreciate that the optical fluid 48 is selected based on 1) the application that the embodiment of the invention is to be used, and 2) the mechanical, optical and chemical compatibility of the optical fluid 48 with the flexible, elastomeric membrane 46. For instance, if the desired application of an embodiment of the invention were to operate in the visible electromagnetic radiation spectrum, the optical fluid 48 includes, for example, a standard water/glycerol mixture. In another instance, if the desired application of an embodiment of the invention were to operate in the near infrared or short wavelength infrared electromagnetic radiation spectrum, the optical fluid 48 includes, for example, a standard oil or a standard polymer fluid.

Optionally, the elastomeric interface 40 includes an elastomeric membrane 46 and an optically transparent optical fluid 48 at least partially encapsulated by the elastomeric membrane. Optionally, the retro-reflector and the elastomeric interface includes, or shares, a common optical axis. The actuator includes a standard mechanical actuator 52. The mechanical actuator 52 includes a standard cylinder longitudinally translatable along the optical axis. Optionally, the interface surface includes an interface periphery. The cylinder is in communication with the interface periphery. Optionally, the actuator 52 includes a standard electromechanical actuator, such as a standard piezo electric actuator.

Optionally, the elastomeric interface 40 includes an elastomeric membrane 46, and an optically transparent optical fluid 48 at least partially encapsulated by the elastomeric membrane. Optionally, the retro-reflector and the elastomeric interface include an optical axis. The interface surface includes an interface periphery. The elastomeric interface 40 includes a standard magnetic elastomer 42. The actuator comprises a standard magnetic actuator 54. The magnetic actuator 54 is in communication with the interface surface. Optionally, the interface surface comprises an interface periphery. The magnetic actuator 54 is in communication with the interface periphery.

Optionally, the elastomeric interface 40 includes an elastomeric membrane 46, and an optically transparent optical fluid 48 at least partially encapsulated by the elastomeric membrane. Optionally, the retro-reflector and the elastomeric interface include an optical axis. The interface surface includes an interface periphery. The elastomeric interface 40 includes a standard dielectric elastomer 44. The actuator comprises a standard dielectric elastomer actuator 56. The dielectric elastomer actuator 56 is in communication with the interface surface. Optionally, the interface surface comprises an interface periphery. The dielectric elastomer actuator 56 is in communication with the interface periphery.

Optionally, as shown by way of illustration in FIGS. 1 and 3-5, the apparatus 10 further includes a standard beam splitter 60. The beam splitter in operation receives the incident optical signal and passes the incident optical signal to the adaptive retro-reflector device 20. The beam splitter 60 includes a standard plate beam splitter 62 (such as shown by way of illustration in FIG. 3), or a standard cube beam splitter 64 (such as shown by way of illustration in FIG. 4). For example, a collimated optical signal beam incident on the cube beam splitter 64 reflects part of the incident light and transmit part; the transmitted part of the incident beam then impinges on the adaptive retro-reflector device 20. Light is reflected back from the adaptive retro-reflector device 20 and is reflected again from the cube beam splitter 64 and is incident on, for example, a standard optical signal detector (not shown). In practice, the beam splitter 60 is, for example, used to monitor the incident beam and to direct the adaptive retro-reflector device 20 to control the divergence. An embodiment of the invention does not include the beam splitter 60. In such an embodiment of the invention, the incident beam is monitored at an optical signal receiver side using, for example, a standard power-in-the-bucket ("PIB") configuration or a standard wavefront sensor, and the adaptive retro-reflector device 20 is instructed by this information in a standard manner.

Figure 7A:
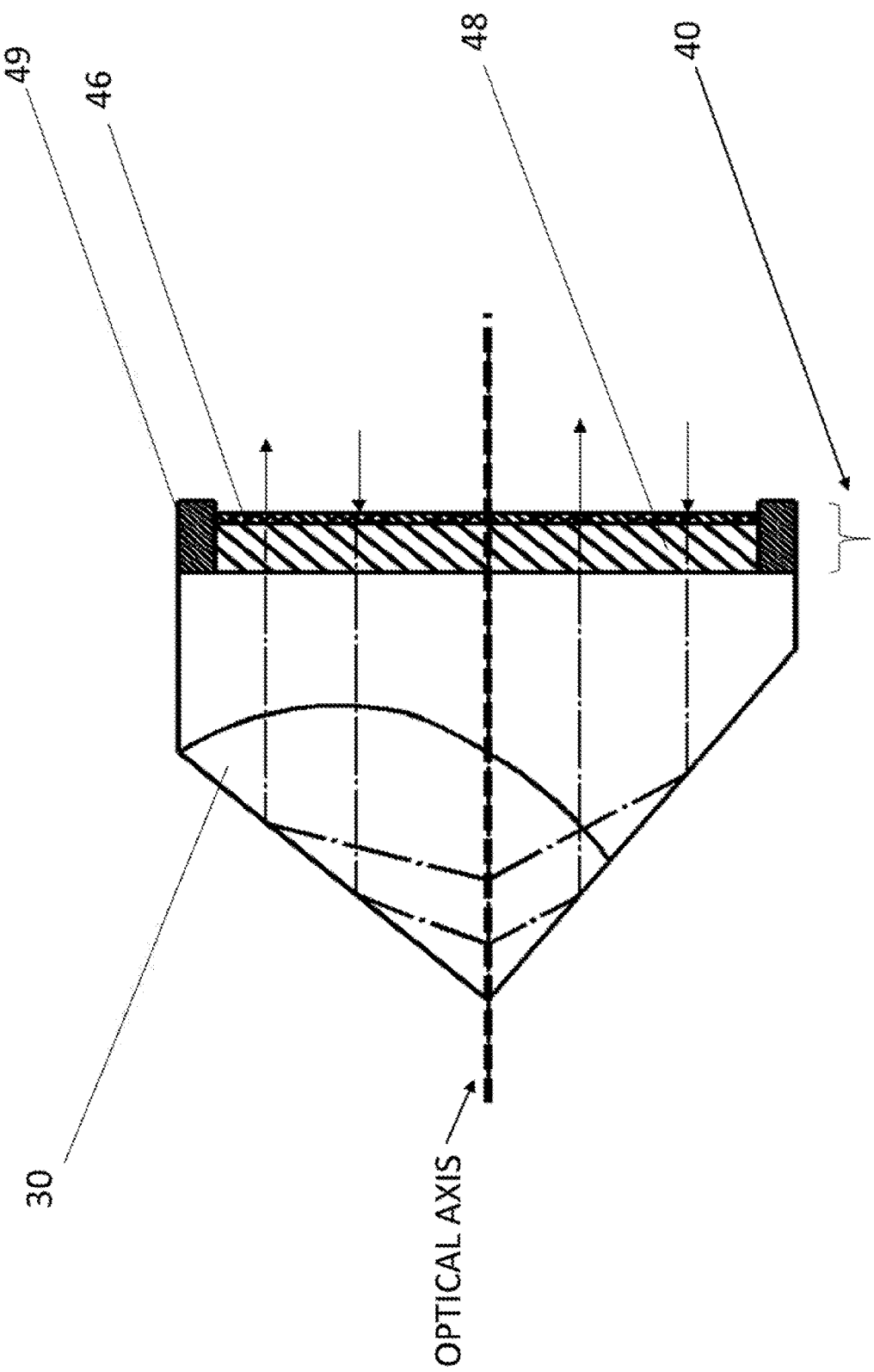
FIG. 7A is a sectional view along the optical axis of an adaptive retro-reflector device with a flat, 2-component elastomeric interface according to embodiment of the invention, the figure showing a ray diagram of illustrative rays of a returned optical signal parallel to illustrative rays of an incident optical signal.
Figure 7B:
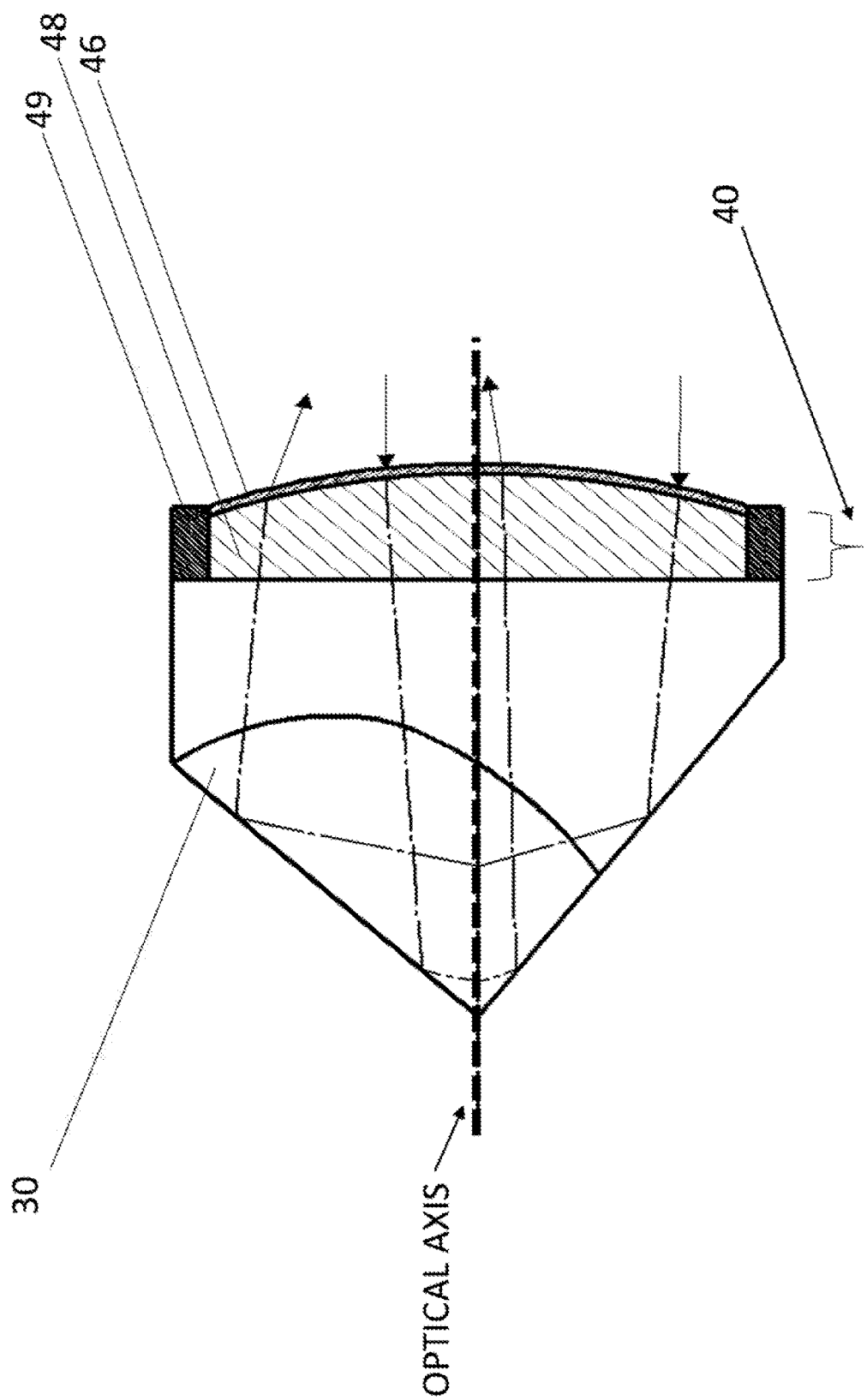
FIG. 7B is a sectional view along the optical axis of an adaptive retro-reflector device with a convex, 2-component elastomeric interface according to an embodiment of the invention, the figure showing a ray diagram of illustrative rays of a returned optical signal converging relative to illustrative rays of an incident optical signal.
Figure 7C:
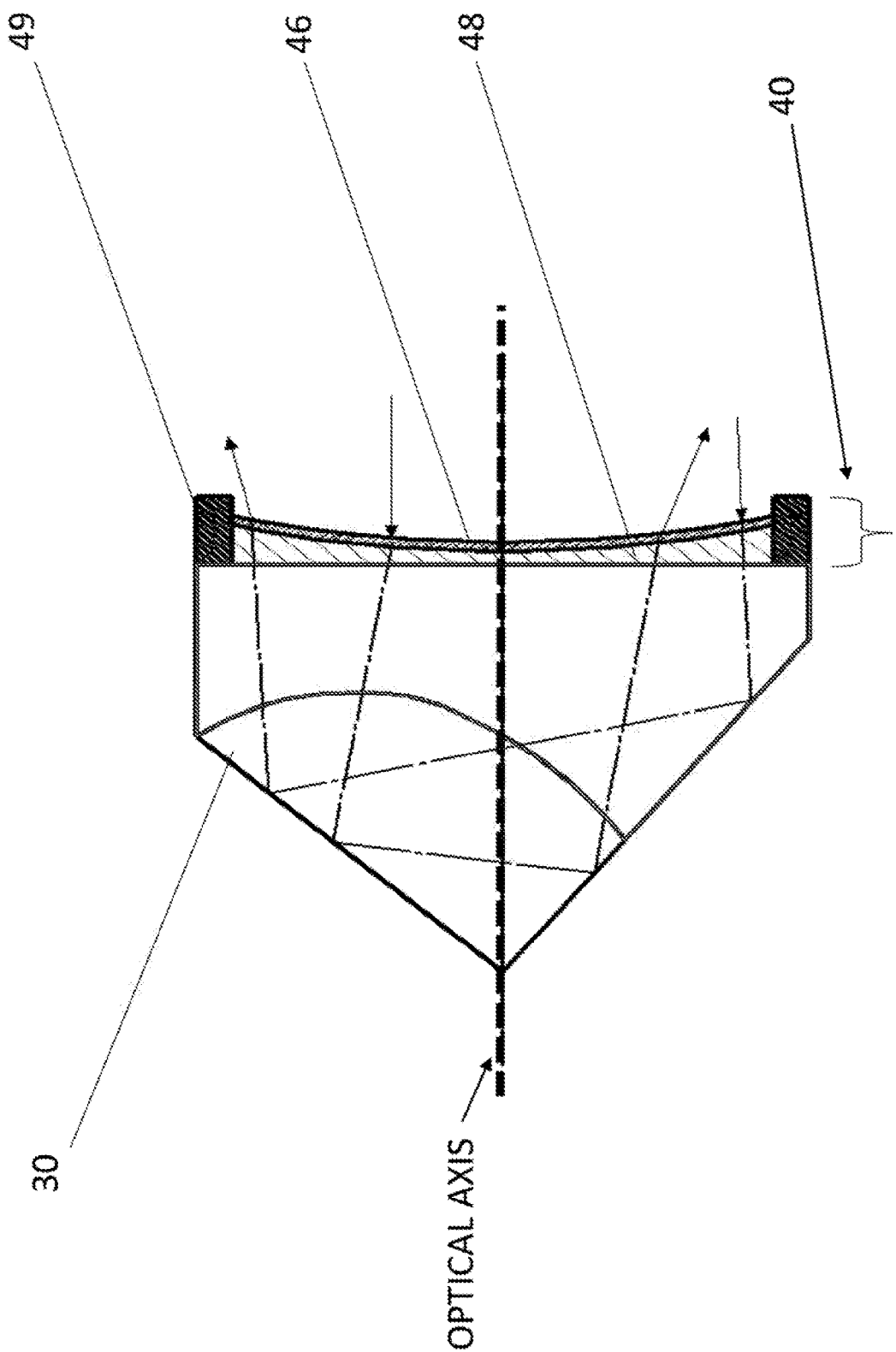
FIG. 7C is a sectional view along the optical axis of an adaptive retro-reflector device with a concave, 2-component elastomeric interface according to embodiment of the invention, the figure showing a ray diagram of illustrative rays of a returned optical signal diverging relative to illustrative rays of an incident optical signal.

Illustrative effects of the interface surface for a 2-component (i.e., elastomeric membrane and optical fluid) elastomeric interface are shown by way of the ray diagrams (indicated by the dash-dot rays) in FIGS. 7A-7C. FIGS. 7A-7C show the elastomeric interface 40 as being aligned with the retroreflector 30 along a common optical axis (indicated by the bold dash-dash line segments) of an embodiment of the invention. FIG. 7A shows an embodiment of the invention having a flat interface surface. Rays of the incident optical signal are received and reflected by the adaptive retro-reflector. Rays of the returned optical signal from the adaptive retro-reflector are parallel to the rays of the incident optical signal. FIG. 7B shows an embodiment of the invention having a convex interface surface. Rays of the incident optical signal are received and reflected by the adaptive retro-reflector. Rays of the returned optical signal from the adaptive retro-reflector exhibit convergence relative to the rays of the incident optical signal. FIG. 7C shows an embodiment of the invention having a concave interface surface. Rays of the incident optical signal are received and reflected by the adaptive retro-reflector. Rays of the returned optical signal from the adaptive retro-reflector exhibit divergence relative to the rays of the incident optical signal.

Another embodiment of the invention is described as follows with reference to FIGS. 1 and 2A-2C. This embodiment of the invention includes an apparatus 10 combines a standard retro-reflector 30 with an elastomeric interface 40, which serves as a refractive active element. The retro-reflector 30 and the elastomeric interface 40 together form an adaptive retro-reflector device 20. The adaptive retro-reflector device 20 receives an incident optical signal, i.e., an incident electromagnetic radiation beam. The adaptive retro-reflector device 20 allows the apparatus 10 to change the divergence of a returned beam. At the same time, the adaptive retro-reflector device 20 maintains the performance of the retro-reflector 30 if the user decide so.

In an embodiment of the invention, the elastomeric interface 40 includes a standard soft polymer. The soft polymer is molded to a desired initial shape. Deformation of the surface of the elastomeric interface 40, i.e., the polymer surface, is made by means of applying, for example, a pressure/compression to the soft polymer, such as via a standard mechanical actuator.

In another embodiment of the invention, the elastomeric interface includes a standard dielectric elastomer. The apparatus 10 includes a standard dielectric elastomer actuator. Deformation of the elastomeric interface 40 is achieved by the use of the dielectric elastomer actuator. A voltage is applied by the dielectric elastomeric actuator to a standard complying electrode, and the soft polymer elastomeric interface is deformed, changing the curvature of the surface of the elastomeric interface.

In an embodiment of the invention, the elastomeric interface 40 includes a flexible polymer elastomeric membrane 46 that encapsulates an optical polymer fluid 48. One of ordinary skill in the art will readily appreciate that the selection of the optical polymer fluid 48 depends on the operational wavelength required for a user's application. The elastomeric interface 40 including the flexible polymer elastomeric membrane 46 and the optical polymer fluid 48 is mounted on the back of a standard retro-reflector, e.g., a standard hollow retro-reflector 32 (such as shown by way of illustration in FIG. 3) or a standard solid retro-reflector 34 (such as shown by way of illustration in FIG. 4). Actuation of this embodiment of the invention is achieved, for example, by a standard actuator that compresses/decompresses the elastomeric membrane. Such compression/decompression deforms the surface of the elastomeric interface 40. For example, the actuator includes a standard mechanical actuator that includes a cylinder moving in and out of the optical axis of the system. Alternatively, for example, the actuator includes a standard magnetic actuator cooperating with a standard magnetic elastomer elastomeric membrane. Alternatively, for example, the actuator includes a standard dielectric elastomer actuator cooperating with a standard dielectric elastomer complaint electrode elastomeric membrane.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. An apparatus comprising:
 a transmitter;
 a receiver one of collocated with and off-axis to said transmitter;
 an adaptive retro-reflector device comprising:
  a retro-reflector in operation receiving an incident optical signal from the transmitter and outputting a returned optical signal to said receiver, the returned optical signal comprising a divergence; and an elastomeric interface in optical communication with said retro-reflector such that the incident optical signal passes through said elastomeric interface to said retro-reflector and such that the returned optical signal from said retro-reflector passes through said elastomeric interface, said elastomeric interface comprising an interface surface; and an actuator in operation communicating with said elastomeric interface so as to deform said interface surface, said retro-reflector being free of deformation, thereby changing a curvature of the interface surface and controlling the divergence.

2. The apparatus according to claim 1, wherein said retro-reflector comprises one of a hollow retro-reflector, a solid retro-reflector, a corner cube retro-reflector, and a cat's eye retro-reflector.

3. The apparatus according to claim 1, wherein said elastomeric interface comprises an optical polymer.

4. The apparatus according to claim 3, wherein said optical polymer comprises at least one of polydimethylsiloxane, an elastic polymer, polymethyl methacrylate, polycarbonate, polystyrene, and liquid silicone.

5. The apparatus according to claim 1, wherein said interface surface comprises one of an unflexed interface surface and a deformed interface surface, said deformed interface surface comprising one of a convex interface surface, a flat interface surface, and a concave interface surface.

6. The apparatus according to claim 1, wherein said retro-reflector and said elastomeric interface comprise an optical axis,
wherein said actuator comprises a mechanical actuator, said mechanical actuator comprising a cylinder longitudinally translatable along the optical axis.

7. The apparatus according to claim 6, wherein said interface surface comprises an interface periphery, the cylinder being in communication with the interface periphery.

8. The apparatus according to claim 1, wherein said retro-reflector and said elastomeric interface comprise an optical axis,
wherein said elastomeric interface comprises a magnetic elastomer,
wherein said actuator comprises a magnetic actuator, said magnetic actuator being in communication with the interface surface.

9. The apparatus according to claim 8, wherein said interface surface comprises an interface periphery, said magnetic actuator being in communication with the interface periphery.

10. The apparatus according to claim 1, wherein said retro-reflector and said elastomeric interface comprise an optical axis,
wherein said interface surface comprises an interface periphery,
wherein said elastomeric interface comprises a dielectric elastomer,
wherein said actuator comprises a dielectric elastomer actuator, said dielectric elastomer actuator being in communication with the interface surface.

11. The apparatus according to claim 10, wherein said interface surface comprises an interface periphery, said dielectric elastomer actuator being in communication with the interface periphery.

12. The apparatus according to claim 1, wherein said elastomeric interface comprises:
an elastomeric membrane; and
an optically transparent optical fluid at least partially encapsulated by said elastomeric membrane.

13. The apparatus according to claim 12, wherein said elastomeric membrane comprises at least one of polydimethylsiloxane, an elastic polymer, polymethyl methacrylate, polycarbonate, polystyrene, and liquid silicone,
wherein said optical fluid comprises at least one of water, glycerol, an oil, a polymer, and a resin.

14. The apparatus according to claim 12, wherein said retro-reflector and said elastomeric interface comprise an optical axis,
wherein said actuator comprises a mechanical actuator, said mechanical actuator comprising a cylinder longitudinally translatable along the optical axis.

15. The apparatus according to claim 14, wherein said interface surface comprises an interface periphery, the cylinder being in communication with the interface periphery.

16. The apparatus according to claim 12, wherein said retro-reflector and said elastomeric interface comprise an optical axis,
wherein said elastomeric interface comprises a magnetic elastomer,
wherein said actuator comprises a magnetic actuator, said magnetic actuator being in communication with the interface surface.

17. The apparatus according to claim 16, wherein said interface surface comprises an interface periphery, said magnetic actuator being in communication with the interface periphery.

18. The apparatus according to claim 12, wherein said retro-reflector and said elastomeric interface comprise an optical axis,
wherein said elastomeric interface comprises a dielectric elastomer,
wherein said actuator comprises a dielectric elastomer actuator, said dielectric elastomer actuator being in communication with the interface surface.

19. The apparatus according to claim 18, wherein said interface surface comprises an interface periphery, said dielectric elastomer actuator being in communication with the interface periphery.

20. The apparatus according to claim 1, further comprising a beam splitter in operation receiving the incident optical signal and passing the incident optical signal to said adaptive retro-reflector device, said beam splitter comprising one of a plate beam splitter and a cube beam splitter.

* * * * *